US010820534B2

(12) United States Patent
Shaffer et al.

(10) Patent No.: US 10,820,534 B2
(45) Date of Patent: Nov. 3, 2020

(54) SYSTEM AND METHOD FOR GROWING AND PROTECTING SEEDLINGS

(71) Applicants: Gary Shaffer, Tickfaw, LA (US); Demetra Kandalepas, Tickfaw, LA (US); George Kandalepas, Toronto (CA)

(72) Inventors: Gary Shaffer, Tickfaw, LA (US); Demetra Kandalepas, Tickfaw, LA (US); George Kandalepas, Toronto (CA)

( * ) Notice: Subject to any disclaimer, the term of this patent is extended or adjusted under 35 U.S.C. 154(b) by 604 days.

(21) Appl. No.: 15/388,921

(22) Filed: Dec. 22, 2016

(65) Prior Publication Data

US 2017/0172071 A1 Jun. 22, 2017

Related U.S. Application Data

(60) Provisional application No. 62/271,129, filed on Dec. 22, 2015.

(51) Int. Cl.
*A01G 13/02* (2006.01)
*A01G 9/029* (2018.01)
*A01G 9/00* (2018.01)
*A01G 9/04* (2006.01)

(52) U.S. Cl.
CPC ......... *A01G 13/0243* (2013.01); *A01G 9/029* (2018.02); *A01G 9/045* (2013.01); *A01G 2009/003* (2013.01); *Y02A 40/228* (2018.01)

(58) Field of Classification Search
CPC .......... A01G 9/029–0299; A01G 9/045; A01G 13/0243; A01G 2009/003

USPC ............................... 47/77, 66.1, 66.5, 85–86
See application file for complete search history.

(56) References Cited

U.S. PATENT DOCUMENTS

| 402,722 A | * | 5/1889 | Cook | ........ A01G 9/0295 47/73 |
| 548,763 A | * | 10/1895 | Simpson | ........ A01G 9/0295 47/73 |
| 1,031,713 A | * | 7/1912 | Hills | ........ A01G 9/026 47/73 |
| 3,147,569 A | * | 9/1964 | Murguia | ........ D02G 1/127 47/73 |

(Continued)

FOREIGN PATENT DOCUMENTS

| FR | 2666958 A1 | * 3/1992 | ......... A01G 13/0243 |
| GB | 1575886 A | * 10/1980 | ............. A01G 9/045 |

OTHER PUBLICATIONS

Machine Translation of FR 2666958 A1 (Year: 1992).*

*Primary Examiner* — Joshua T Semick
(74) *Attorney, Agent, or Firm* — AdamsIP, LLC; J Hunter Adams; Stephen Thompson

(57) ABSTRACT

A system and method for growing and protecting tree seedlings is provided. The system includes potting tubes that may function as a pot for growing seedlings and additionally as a tree guard for protecting transplanted tree seedlings from pests. The potting tubes are open at both ends and may be secured to a bottom end cap for use as a pot. After a growth period, the end cap can be removed and the tree can be transplanted with the tube surrounding the tree for use as a tree guard. The system includes a tray with end caps attached to the tray for transporting and transplanting large numbers of tree seedlings.

8 Claims, 9 Drawing Sheets

(56) References Cited

U.S. PATENT DOCUMENTS

| | | | | |
|---|---|---|---|---|
| 3,313,333 A * | 4/1967 | Lordi | B65D 65/08 | 220/666 |
| 4,112,619 A * | 9/1978 | Morsani | A01G 9/02 | 47/66.1 |
| 4,159,597 A * | 7/1979 | Olsen | A01G 9/0297 | 47/58.1 R |
| 4,192,096 A * | 3/1980 | Platt | A01G 9/0295 | 47/73 |
| 4,216,621 A * | 8/1980 | Olsen | A01G 9/0295 | 47/73 |
| 4,325,202 A * | 4/1982 | Liard | A01G 9/02 | 428/8 |
| 4,628,634 A * | 12/1986 | Anderson | A01G 9/029 | 47/73 |
| 5,359,809 A * | 11/1994 | Johnson | A01G 23/04 | 220/4.24 |
| 6,481,593 B2 * | 11/2002 | Banhagel | A01G 9/029 | 220/676 |
| 6,637,156 B2 * | 10/2003 | Stewart | A01G 27/04 | 220/8 |
| 8,474,180 B2 * | 7/2013 | Berk | A01G 24/44 | 47/65.9 |
| 8,944,311 B2 * | 2/2015 | Dougherty | A47F 3/14 | 206/769 |
| 9,179,608 B2 * | 11/2015 | Kempf | A01G 23/04 | |
| 9,227,776 B2 * | 1/2016 | Chapel | B65D 71/70 | |
| 9,414,547 B2 * | 8/2016 | Guggenheim | A01G 22/00 | |
| 10,375,899 B2 * | 8/2019 | Munt, III | A01G 9/026 | |
| 2003/0213175 A1 * | 11/2003 | Rhindress | A01G 9/029 | 47/73 |
| 2008/0222950 A1 * | 9/2008 | Rooker | A01G 9/085 | 47/65.5 |

* cited by examiner

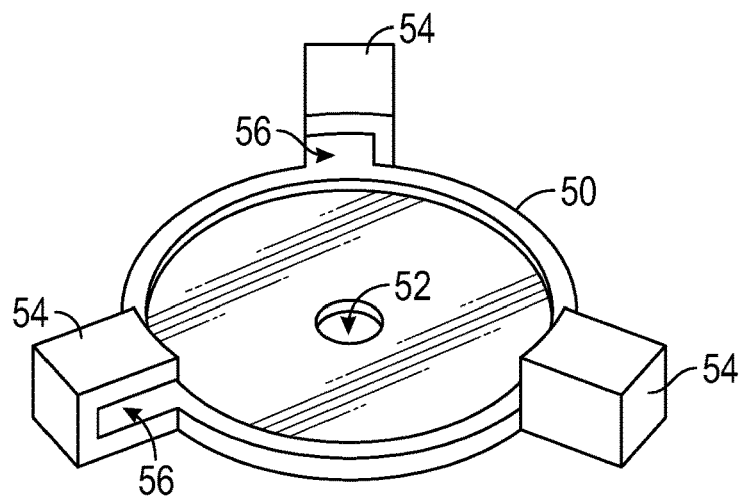
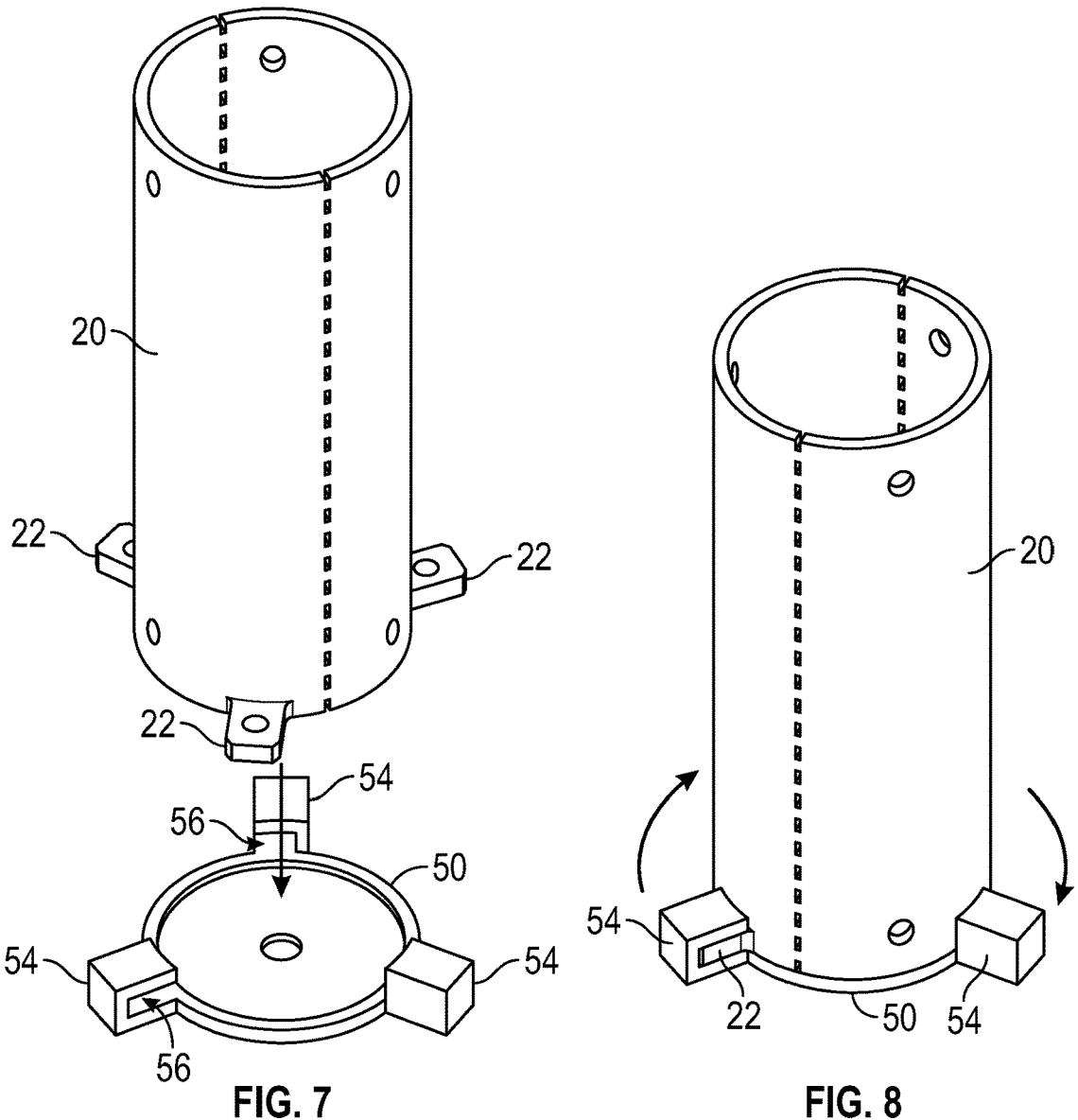
FIG. 6
FIG. 7
FIG. 8

SYSTEM AND METHOD FOR GROWING AND PROTECTING SEEDLINGS

CROSS REFERENCES

This application claims the benefit of U.S. Provisional Application No. 62/271,129, filed on Dec. 22, 2015, which application is incorporated herein by reference.

FIELD OF THE INVENTION

A preferred embodiment of the invention is directed to an apparatus and method for growing and protecting tree seedlings.

BACKGROUND

In wetlands restoration, seedlings of hardwood trees such as bald cypress and water tupelo are typically grown in one gallon pots to a certain size before the seedlings are transplanted to a final location in the wetlands to be restored. This process requires the seedlings to be transported in pots from a nursery to the restoration site. Seedlings are then individually removed from each pot and transplanted in the wetland area. This process is time-consuming, labor-intensive, and costly. The pots filled with soil are relatively heavy and bulky and require significant space during transportation from a nursery to a staging area for accessing the restoration site. Once at the staging area, each pot must be transported into the wetlands for transplanting. A transport sled may be used to transport multiple pots, but this process typically requires numerous trips due to the large number of trees to be transplanted. Thus, this type of operation is time-consuming and may cause excessive damage to existing plants and wetland soil.

Once transplanted, the seedlings must be protected from various pests until the trees reach a certain size, which typically takes several years. Young trees may face high rates of herbivory from rodents such as nutria (*Myocastor coypus*) or other animals such as deer or wild hogs. To protect the young seedlings, a tree guard is typically placed around each individual tree. Tree guards are typically made of heavy plastic sheets. Individual plastic sheets are wrapped around each seedling and connected at each end to form a continuous barrier surrounding the tree on all sides. Each tree guard is typically held in place with a single support stake that the guard is attached to by tying or by a similar method. The process of transporting tree guards onto the restoration site and installing tree guards around each seedling also is a time-consuming, labor-intensive, and costly process, though it is an important part of the process in order to achieve an acceptable tree survival rate.

Accordingly, a need exists in the art for an improved system and method for growing and protecting tree seedlings that can be used to efficiently grow and protect a relatively large number of trees.

SUMMARY

In one aspect, an apparatus for growing and protecting tree seedlings is provided. The apparatus comprises a potting tube and a removable bottom end cap for covering the bottom end of the potting tube. The bottom end cap may be secured to the bottom of the potting tube so that the potting tube can be used as a pot for planting and growing a tree seedling. Once the seedling reaches a certain size (typically about three feet in height), the bottom end cap may be removed from the potting tube, and the tree can be transplanted with the potting tube remaining around the young tree for protection from pests. Thus, the potting tube functions as both a pot for growing seedlings and as a tree guard for protecting young trees. The potting tube may be removed once the tree has reached a sufficient size. In a preferred embodiment, the potting tube has lines of perforations on opposing sides, which allow the potting tube to be broken into two parts by pressure due to the natural growth of the trunk of the tree.

The potting tube has a top end and a bottom end, wherein the top end and the bottom end are both open. The potting tube preferably has feet attached to its exterior adjacent to the bottom end and extending outwardly from the potting tube in a radial direction. The feet provide additional support to assist in keeping the potting tube in an upright position. The bottom end cap and the feet are configured for removably securing the feet to the bottom end cap such that the bottom end cap covers the bottom opening of the potting tube. With the bottom opening covered, the potting tube functions as a pot, and a tree seed or seedling is planted inside the potting tube. The bottom end cap is then removed from the potting tube for transplanting the tree after a desired growth period. By this time, the tree has typically rooted sufficiently in the soil so that very little soil falls out of the potting tube through the bottom opening. To transplant the tree, a hole may be dug for the tree and the potting tube may be placed over the hole. The tree and root mass may then be pushed downward through the bottom opening and into the hole. In some instances, such as in soft soils often found in wetlands, the tree and root mass may be pushed down directly into the soft soil without the need of first digging a hole. Thus, the apparatus eliminates the need for manually removing each tree from a pot before transplanting the tree. Once the tree is transplanted, the potting tube may be secured to the ground, preferably using stakes, so that the tube remains in place and functions as a tree guard to protect the young tree.

In a preferred embodiment, the apparatus further comprises an extension tube that nests inside the potting tube. After transplanting the tree, the extension tube may be lifted upward to extend the length of the potting tube, thereby providing greater protection to the young tree.

In another aspect, a system for growing and transplanting tree seedlings is provided. The system comprises a plurality of potting tubes and a tray having a plurality of bottom end caps attached to the tray. A potting tube is secured to each bottom end cap on the tray so that a large number of potting tubes can be carried or otherwise transported as a single unit. A seedling is planted in each of the potting tubes secured to the tray and allowed to grow for a desired growth period. The tray may then be transported to a site for transplanting the trees, such as a restoration area. Each individual potting tube may then be removed from the tray on site, and the tree seedling contained therein may be transplanted with the potting tube remaining around the young tree for protection. This system allows large numbers of trees to be transplanted quickly and efficiently with minimal labor, thereby reducing the costs of transplanting large numbers of trees, as required in wetlands restoration. The potting tubes utilize a minimum amount of soil for planting and can be secured to the tray in close proximity to each other. Thus, the system allows a larger number of trees to be transported on a transport vehicle than in existing methods, thereby reducing costs. The system also requires fewer people to carry the trees into the restoration site and transplant the trees, further reducing costs.

DESCRIPTION OF THE DRAWINGS

These and other features, aspects, and advantages of the present invention will become better understood with regard to the following description, appended claims, and accompanying drawings where:

FIG. 6 is a perspective view of an apparatus in accordance with the present invention.

FIG. 7 is a perspective view of an apparatus in accordance with the present invention.

FIG. 8 is a perspective view of an apparatus in accordance with the present invention.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
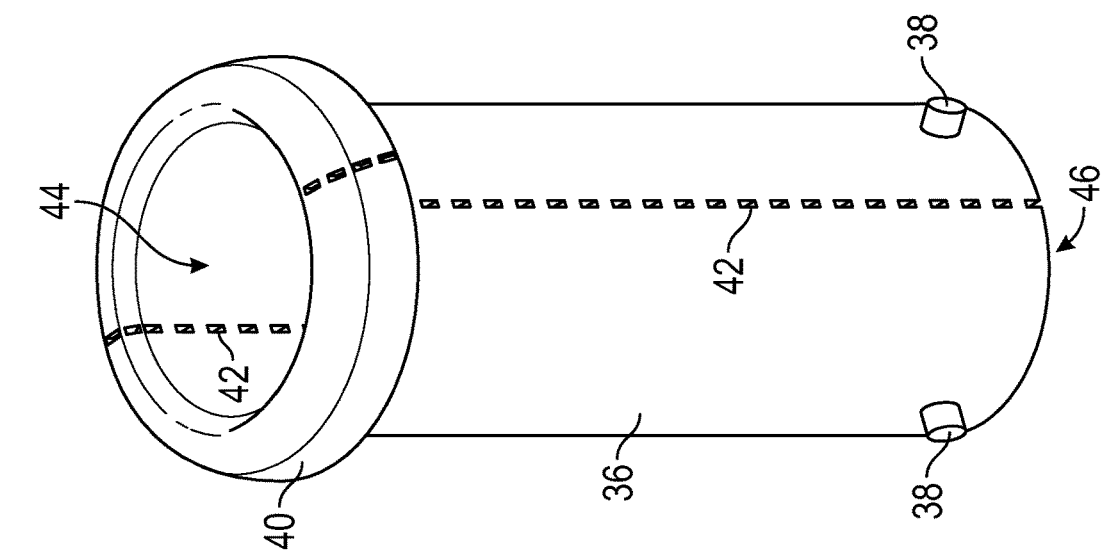
FIG. 1 is a perspective view of an apparatus in accordance with the present invention.
Figure 2:
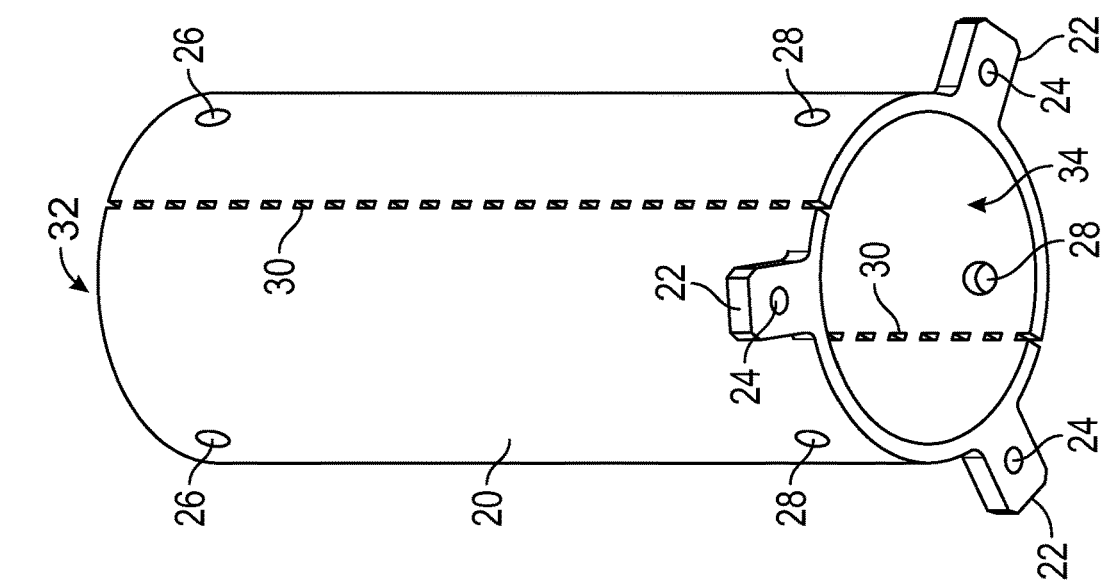
FIG. 2 is a perspective view of an apparatus in accordance with the present invention.

FIGS. 1-2 show a potting tube 20 for planting a tree seed or seedling therein. The potting tube 20 may be used as both a pot for planting and growing a tree seedling and as a tree guard for protecting a young tree after transplanting the tree in the ground. The potting tube 20 has a top end 32 and a bottom end 34. Both ends of the potting tube are open. In a preferred embodiment, the potting tube 20 is cylindrical in shape as shown in the figures. The potting tube 20 preferably has feet 22 attached to its exterior adjacent to the bottom end 34 and extending outwardly from the potting tube 20 in a radial direction. Each foot 22 preferably has a hole 24 extending therethrough for staking the potting tube 20 into the ground for use as a tree guard. In a preferred embodiment, the potting tube 20 has lines of perforations 30 on opposing sides, which allow the potting tube 20 to be broken into two parts by pressure due to the natural growth of the trunk of the tree.

Figure 3:
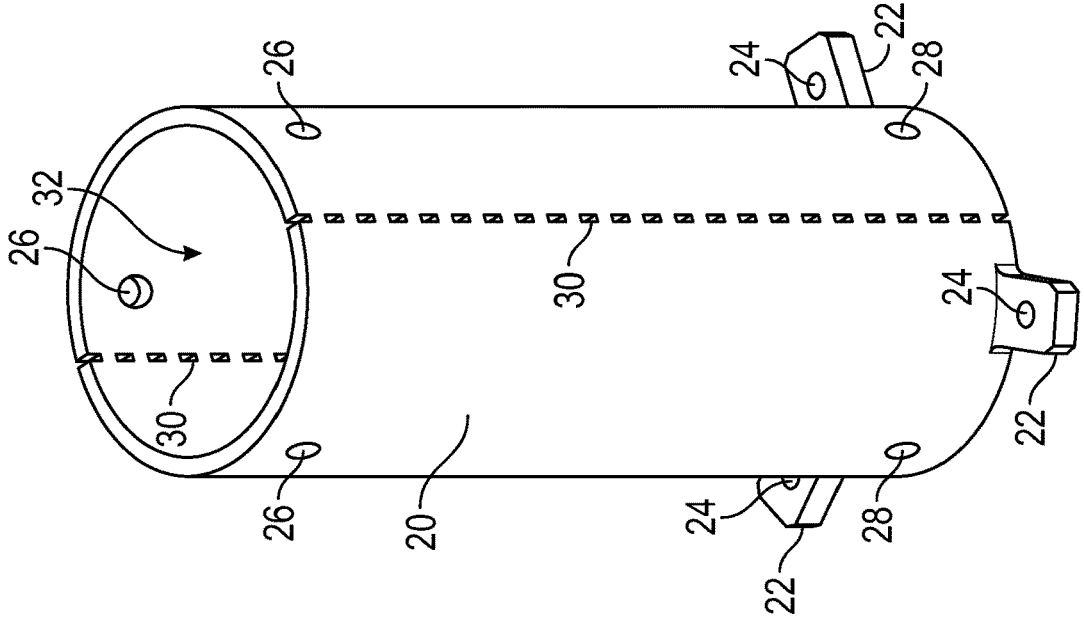
FIG. 3 is a perspective view of an apparatus in accordance with the present invention.

FIG. 3 shows an extension tube 36, which may be used to extend the length of the potting tube 20 after transplanting the tree in order to provide greater protection to the young tree. The extension tube 36 has a top end 44 and a bottom end 46. Both ends of the extension tube are open. The potting tube 20 and the extension tube 36 are configured such that the bottom end 46 of the extension tube 36 may be secured to the top end 32 of the potting tube 20. In a preferred embodiment, the potting tube 20 has a set of holes 26 near the top end 32 of the potting tube 20 and a set of holes 28 near the bottom end 34 of the potting tube 20, and the extension tube 36 has a corresponding set of protrusions 38 located near the bottom end 46 of the extension tube 36.

Figure 4:
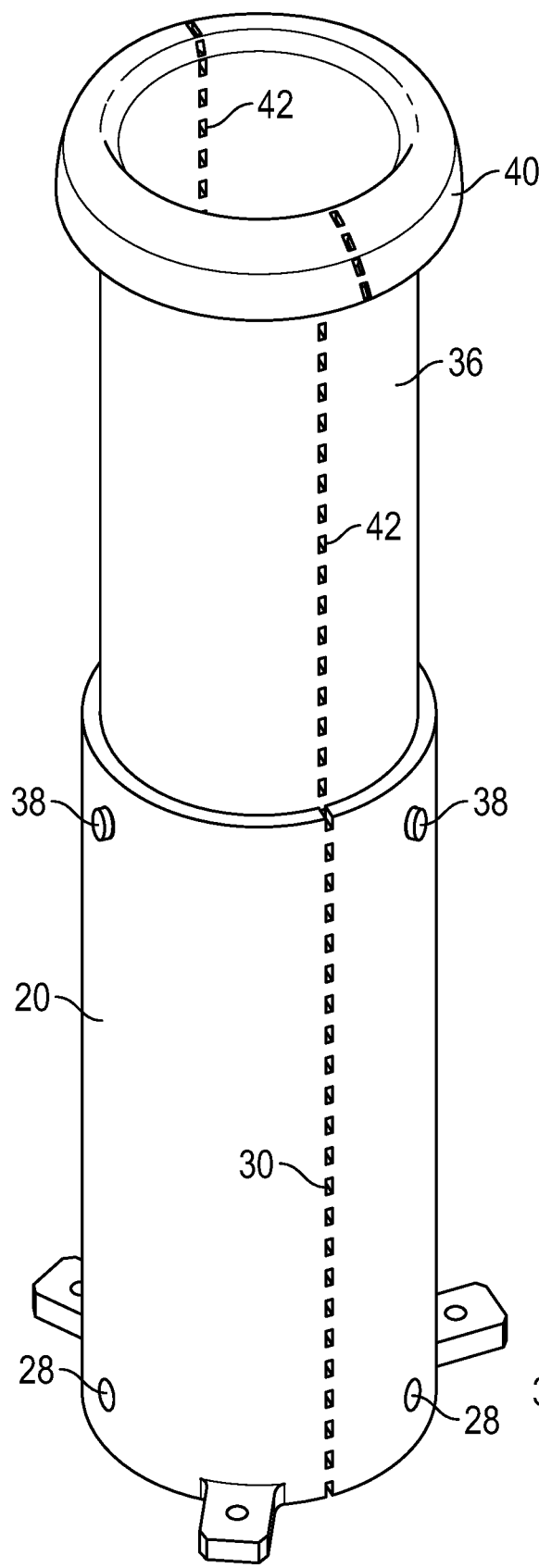
FIG. 4 is a perspective view of an apparatus in accordance with the present invention.
Figure 5:
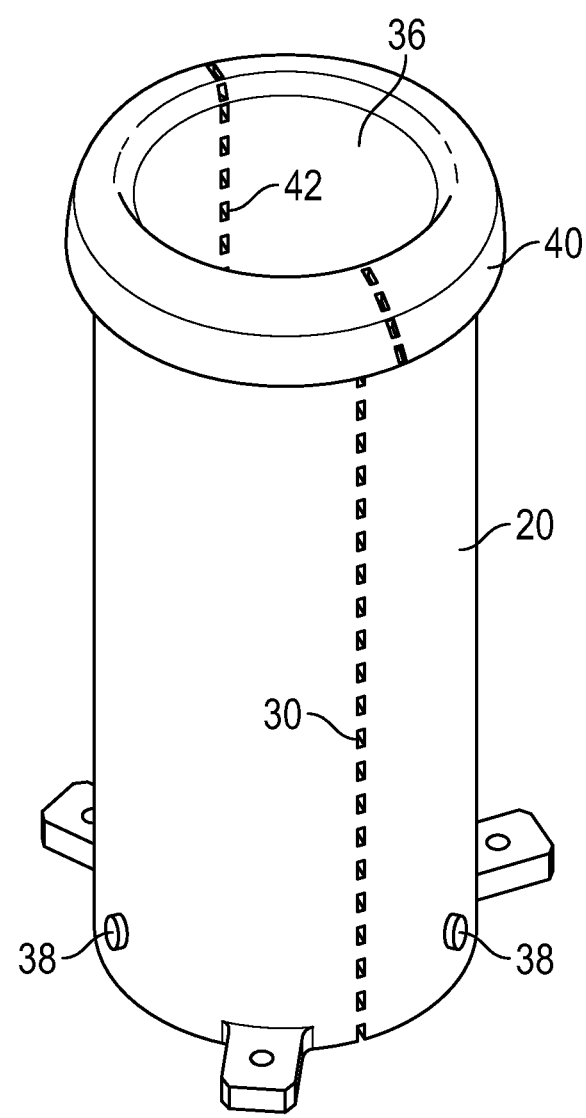
FIG. 5 is a perspective view of an apparatus in accordance with the present invention.

In a preferred embodiment, the extension tube 36 is sized such that it can be nested within the potting tube 20. FIGS. 4 and 5 illustrate the extension tube 36 nested within the potting tube in an extended position and in a collapsed position, respectively. As shown in FIG. 4, the protrusions 38 protrude into the upper set of holes 26 when in the extended position. As shown in FIG. 5, the protrusions 38 protrude into the lower set of holes 28 when in the collapsed position. The protrusions 38 protruding into the holes 26 and 28 of the potting tube 20 secure the extension tube 36 in either an extended or collapsed position.

The extension tube 36 is preferably in the collapsed position when the potting tube 20 is filled with soil and a tree seedling is planted therein. In this position, the extension tube 36 provides added structural stability to the apparatus for use as a pot. After transplanting the tree with the potting tube 20 surrounding the tree, the extension tube 36 is preferably moved to the extended position to provide greater protection for the young tree. As shown in FIGS. 3 and 4, the extension tube 36 preferably has lines of perforations 42 on opposing sides, which are preferably aligned with the lines of perforations 30 of the potting tube 20 when the extension tube 36 is secured to the potting tube 20, as shown in FIG. 4. The two sets of perforations 30 and 42 allow both the potting tube 20 and the extension tube 36 to each be broken into two parts by pressure exerted on the insides of the tubes due to the natural growth of the trunk of the tree.

In a preferred embodiment, the extension tube 36 has a lip 40 extending outwardly from the top end 44 of the extension tube 36, as seen in FIG. 3. The lip 40 has a curved surface so that the apparatus does not cause damage to young trees. At the time of transplanting, young trees are typically small enough that wind will cause the trees to move, thereby causing the bark of the trees to contact and rub against the inner surface of the lip 40 as a tree moves in the wind. This may particularly be a problem during strong wind events, which may cause a sawing action on the exterior of the tree bark. A curved lip 40 is preferred so that this contact does not damage the bark of the tree. The outer portions of the lip 40 preferably curve downward so that the lip 40 covers the rim at the top end 32 of the potting tube 20 when the extension tube 36 is in a collapsed position, as shown in FIG. 5. This helps to prevent soil or debris from getting in between the two tubes.

FIG. 6 shows a bottom end cap 50 used for covering the bottom end 34 of the potting tube 20 so that the potting tube can function as a pot for planting a tree seed or seedling therein. The bottom end cap 50 and the potting tube 20 are configured for removably securing the potting tube 20 to the bottom end cap 50 such that the bottom end cap 50 covers the bottom opening 34 of the potting tube 20. In a preferred embodiment, the bottom end cap 50 comprises an attachment element 54 corresponding to each respective foot 22 of the potting tube 20. As seen in FIGS. 1 and 6, the potting tube 20 preferably has three equally spaced feet 22, and the bottom end cap 50 preferably has three corresponding attachment elements 54. In a preferred embodiment, each attachment element 54 has a slot 56 configured for simultaneously inserting each foot 22 into a respective slot 56 such that the potting tube 20 is removably secured to the bottom end cap 50.

Figure 10:
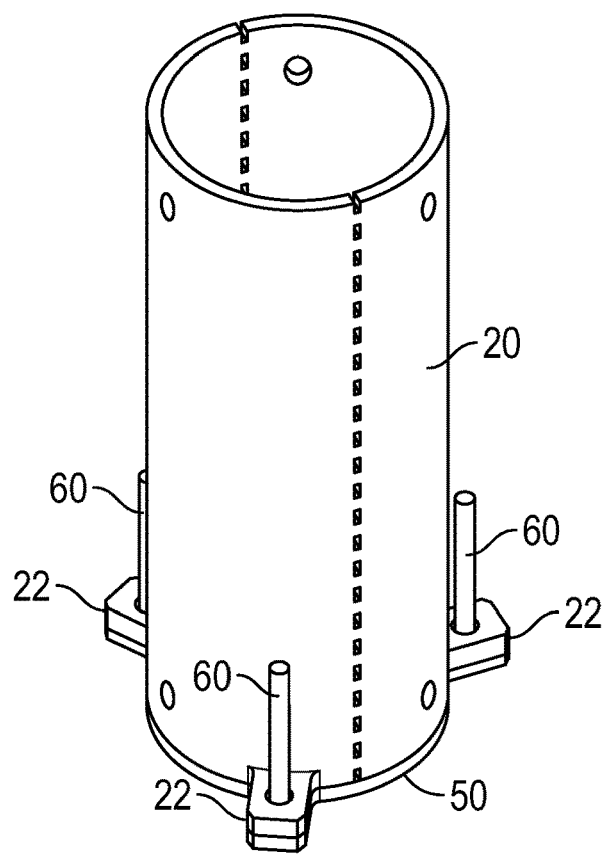
FIG. 10 is a perspective view of an apparatus in accordance with the present invention.

FIGS. 7 and 8 illustrate the process of removably securing a potting tube 20 to the bottom end cap 50 shown in FIG. 6. First, the potting tube 20 is positioned so that the feet 22 are offset from the attachment elements 54 of the bottom end cap 50. The bottom end 34 of the potting tube 20 is then moved downward onto the bottom end cap 50 and rotated so that the feet 22 are simultaneously inserted into each corresponding slot 56 of the attachment elements 54, thereby interlocking the feet 22 with the attachment elements 54 of the bottom end cap 50. As used herein, the term "removably secured" or equivalent terms means that the potting tube 20 may be secured to and removed from the bottom end cap 50 without the use of special tools. Further, the term "removably secured" or equivalent terms indicates that the potting tube 20 is secured to the bottom end cap 50 in a manner such that the potting tube 20 is maintained in an upright position, as shown in FIG. 10, for instance.

Figure 9:
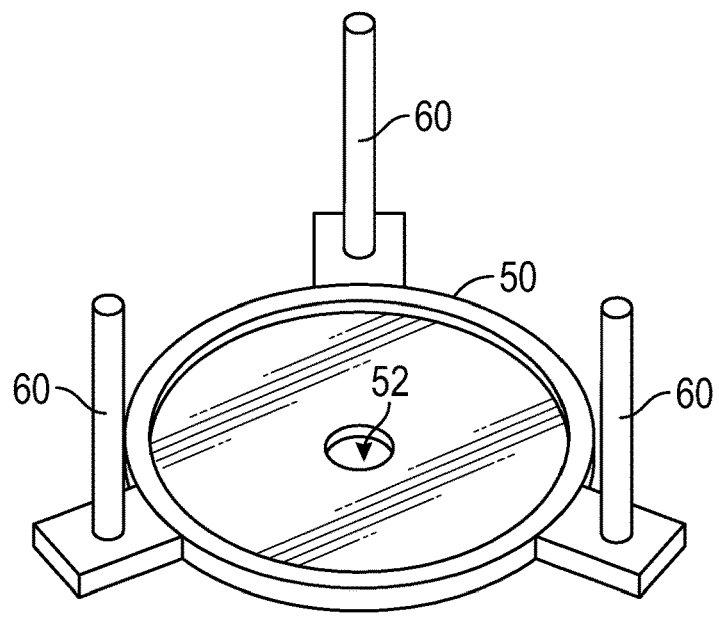
FIG. 9 is a perspective view of an apparatus in accordance with the present invention.

FIG. 9 illustrates an alternative embodiment of a bottom end cap 50. In this embodiment, the bottom end cap 50 comprises attachment elements each having an upwardly extending peg 60 corresponding to a respective foot 22 of the potting tube 20. The pegs 60 of the bottom end cap 50 and feet 22 of the potting tube 20 are configured to simultaneously insert each peg 60 into a hole 24 in its corresponding foot 22 such that the potting tube 20 is removably secured to the bottom end cap 50, as shown in FIG. 10. Thus, the upwardly extending pegs 60 maintain the potting tube 20 in an upright position.

Figure 11:
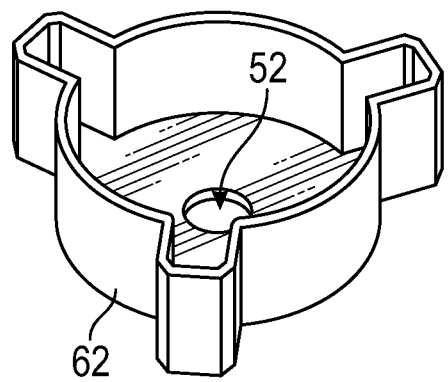
FIG. 11 is a perspective view of an apparatus in accordance with the present invention.
Figure 12:
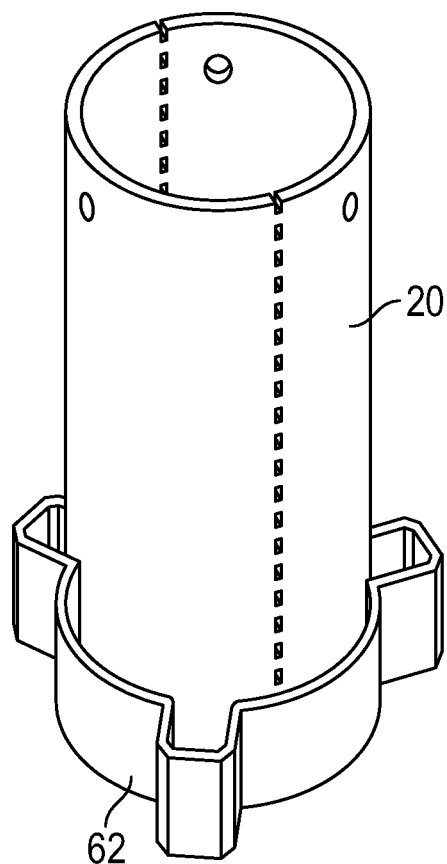
FIG. 12 is a perspective view of an apparatus in accordance with the present invention.

FIG. 11 illustrates another alternative embodiment of a bottom end cap 50. In this embodiment, the bottom end cap 50 comprises a cup 62 having a shape corresponding to the bottom end 34 of a potting tube 20. The cup 62 is configured to removably secure a potting tube 20 to the cup 62 by inserting the bottom end 34 of a potting tube 20 into the cup 62, as shown in FIG. 12. The cup 62 covers the open bottom end 34 of the potting tube 20 while maintaining the potting tube 20 in an upright position. In this embodiment, the potting tube may optionally be constructed without feet.

In a preferred embodiment, each bottom end cap 50 has a hole 52 therein, as shown in FIGS. 6, 9, and 11. The hole 52 may allow drainage of excess water from soil contained in the potting tube 20. In other instances, the bottom of the potting tube 20 may be submerged in water to simulate a wetland environment for certain tree species to be transplanted into wetlands, and the hole 52 may allow water uptake into the soil.

Figure 13:
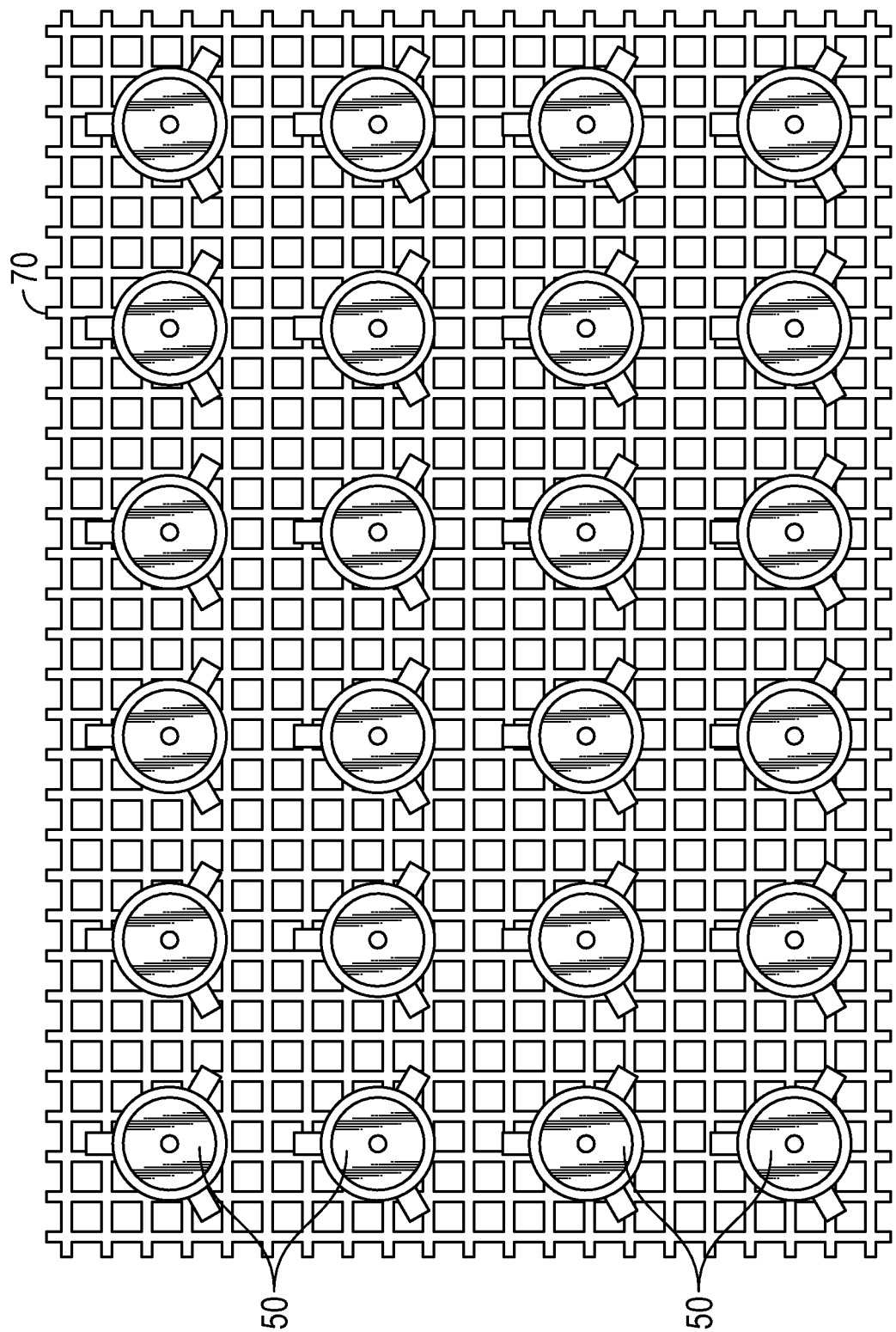
FIG. 13 is a top plan view of a tray which may be used in accordance with the present invention.
Figure 14:
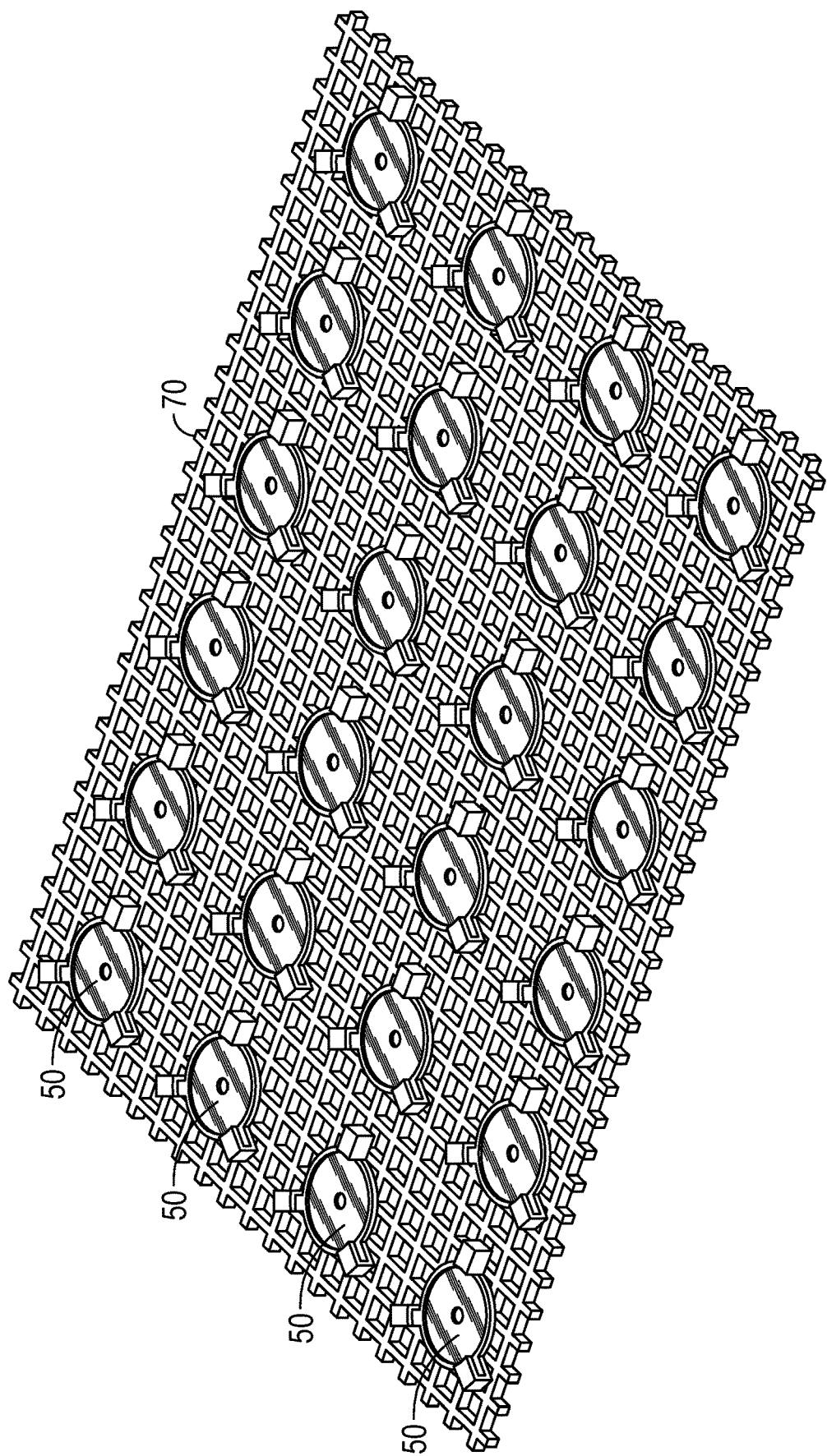
FIG. 14 is a perspective view of a tray which may be used in accordance with the present invention.

In another aspect, a system for growing, transporting, and protecting tree seedlings is provided. The system comprises a plurality of potting tubes 20 and at least one tray 70 having a plurality of bottom end caps 50 attached to the tray 70. FIG. 13 shows a top view of a tray 70 in accordance with the present disclosure, and FIG. 14 shows a perspective view of a tray 70 in accordance with the present disclosure. For purposes of illustration, FIGS. 13 and 14 show bottom end caps 50 as shown in FIG. 6 attached to the tray 70. It should be understood that end caps 50 as shown in FIG. 9 or 11, or any similar type of end cap configured for removably securing a potting tube thereto, may be utilized. In a preferred embodiment, twenty-four end caps are attached to the tray 70 in a four-by-six configuration, though the tray may be sized to accommodate any number of end caps attached thereto. As used herein, the term "tray" refers to any substantially rigid piece of material suitable for attaching end caps thereto. In a preferred embodiment, as seen in FIG. 13, the tray 70 is a grid having spaces throughout the tray. The spaces allow any loose soil that falls on the tray when adding soil to potting tubes 20 attached thereto to fall through the tray. Alternatively, the tray may be a solid piece of material.

In a preferred embodiment, the system further comprises a plurality of extension tubes 36, which may be secured to the potting tubes 20 in an extended position to provide greater protection to seedlings after transplanting, and a plurality of stakes 72, which may be used to secure each potting tube 20 to the ground after transplanting in order to keep to the potting tubes in place to properly function as tree guards.

Figure 15:
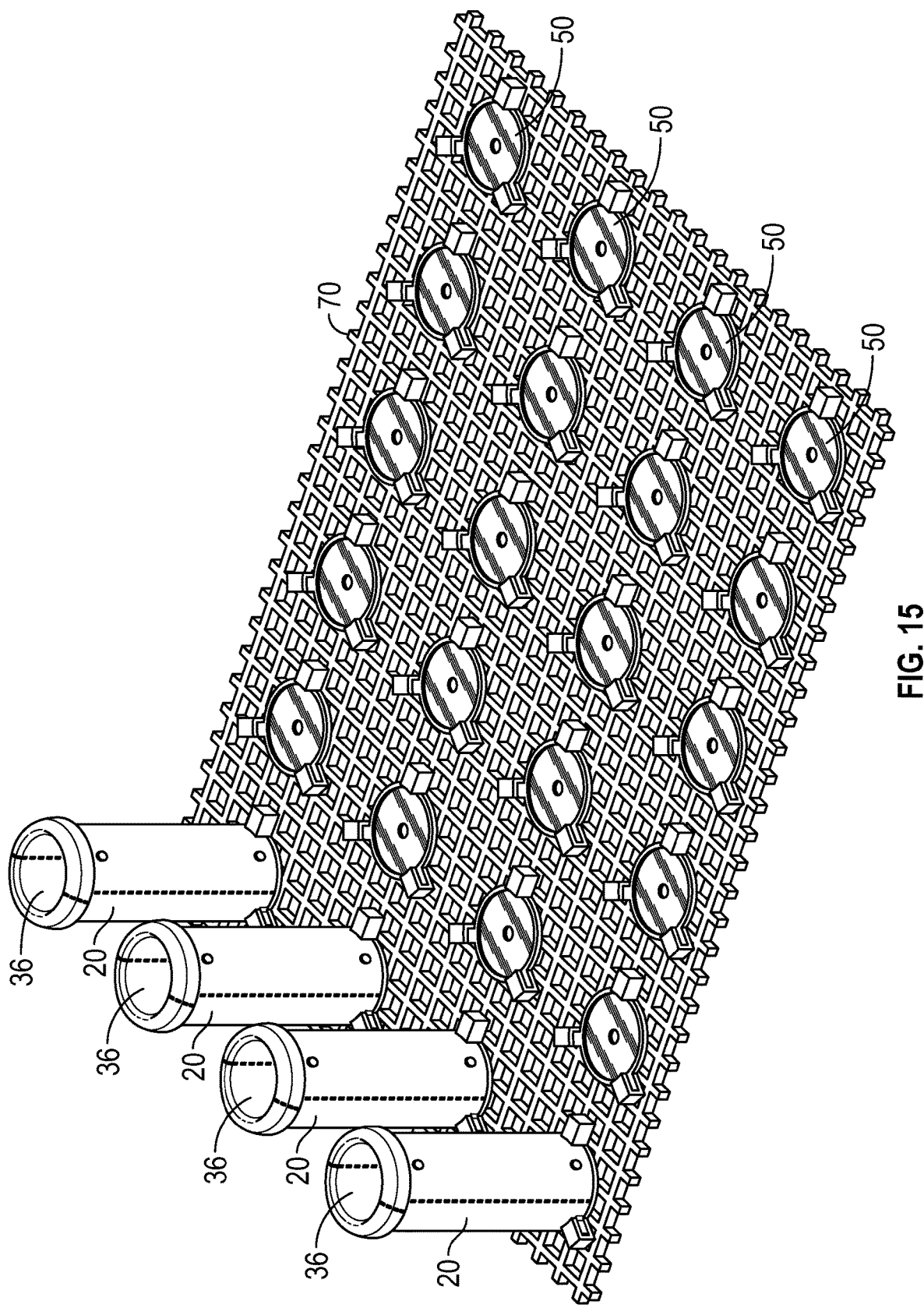
FIG. 15 is a perspective view of a system in accordance with the present invention.

To use the system for growing and protecting tree seedlings, a user first secures potting tubes 20 to the bottom end caps 50 attached to the tray 70. Preferably, an extension tube 36 is nested within each of the potting tubes 20 to form a potting assembly secured to the tray 70. For purposes of illustration, FIG. 15 shows a tray 70 with four potting tubes 20 secured to the tray 70 with corresponding extensions tubes 36 nested within the potting tubes 20. Soil is then added into the top opening of each of the potting assemblies, and a tree seed or seedling is planted therein. The bottom end caps 50 form the bottom for each potting tube 20 so that the potting tubes 20 function as pots for growing the seedlings. The trees are then allowed to grow to a desired size during a growth period before transplanting the trees. During the growth period, a wetland environment may be simulated by placing the tray 70 in a small amount of water. Water is then taken up through the holes 52 in the end caps 50 to simulate wetland soil conditions. In addition, as seen in FIG. 1, the line of perforations 30 in the potting tube 20 preferably has a series of small holes that will allow uptake of water into the potting tube, as well as drainage of water from inside the potting tube, depending on the desired growing conditions.

When the trees are ready to be transplanted, the tray 70 with trees growing inside the potting tubes 20 may be transported to a transplanting site, such as a wetlands restoration area. This process may involve leaving the tray 20 outdoors for an extended period of time during the growth period, such as at a nursery or a staging area near the transplanting site. The design of the tray 70 with the potting tubes 20 secured to the tray prevents any pots holding seedlings from overturning due to wind or other causes, which may result in a loss of seedlings if the pots are not checked regularly. Thus, the design of the tray ensures stability of the potting tubes 20 and allows trays 70 to be left in a restoration staging area, which may be a remote site, without regularly checking for overturned pots. In addition, due to the elongated design of the potting tubes 20, weed growth in the potting soil is minimized if the trees are left in a staging area for an extended period of time.

The tray 70 may then be transported to the transplanting site, and individual potting tubes 20 may be removed from the bottom end caps 50 on the tray 70 for transplanting. The end caps 50 remain attached to the tray 70. By the time of transplanting, the trees have typically rooted sufficiently in the potting soil so that most of the soil in the potting tube 20 will remain in the potting tube and will not drop out of the opening at the bottom end 34 of the potting tube 20 when the potting tube is removed from the tray 70.

Figure 16:
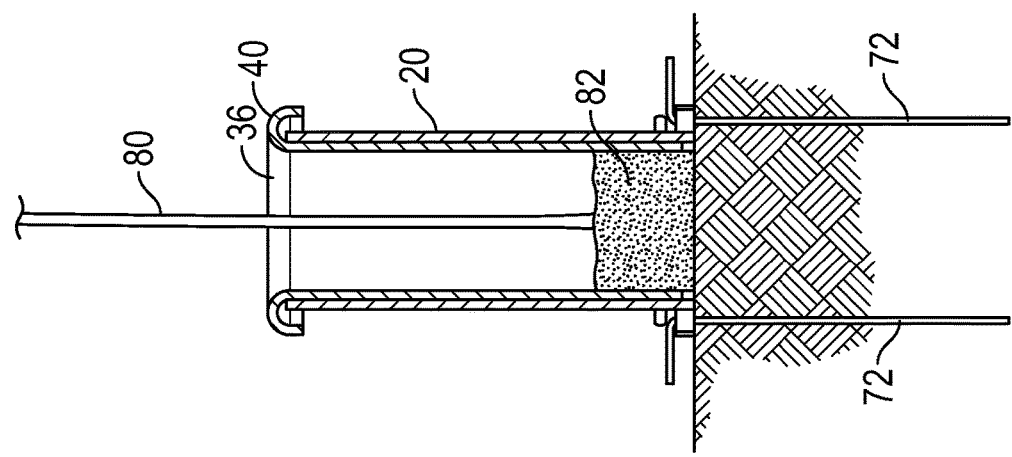
FIG. 16 is a cross-sectional side elevation view of an apparatus being used for transplanting a tree seedling in accordance with the present invention.

The tree may then be transplanted in the ground at a final location with the potting tube 20 surrounding the tree to function as a tree guard for protecting the tree from pests. FIG. 16 illustrates a tree 80 growing in potting soil 82 inside a potting tube 20 that has been removed from the tray 70 and placed on the ground for transplanting. To transplant the tree 80, a hole may be dug in the ground for the tree, and the potting tube 20 may be placed over the hole. The tree 80 and the root mass with potting soil 82 may then be pushed downward through the bottom opening 34 of the potting tube 20 and into the hole. In soft wetland soils, the tree 80 and root mass with potting soil 82 may be pushed down into the soft soil without the need of first digging a hole, depending on the soil conditions. Once the tree and root mass are pushed down into the ground, the potting tube 20 may remain in place. Stakes 72 may then be inserted through the holes 24 in the feet 22 of the potting tube 20 and driven into the ground, as shown in FIG. 16, to secure the potting tube 20 in place surrounding the tree 80. The stakes 72 are preferably about the same length as the potting tube 20 and may be made of a variety of materials, such as metal, plastic, bamboo, or wood such as treated pine. Because the tree 80 and potting soil 82 are pushed downward through the bottom opening 34 of the potting tube 20 to transplant the tree, the system eliminates the need for manually removing each tree from a pot before transplanting the tree.

Figure 17:
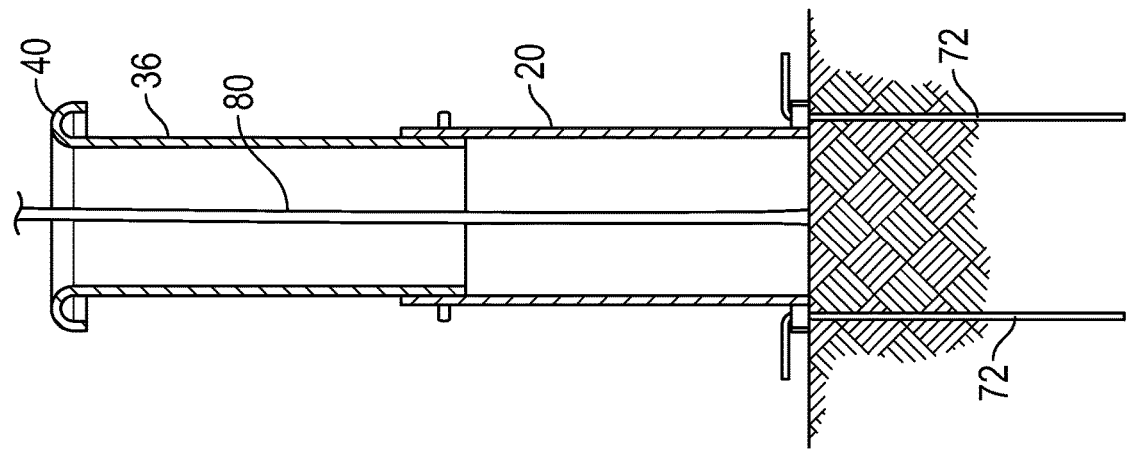
FIG. 17 is a cross-sectional side elevation view of an apparatus being used for transplanting a tree seedling in accordance with the present invention.

FIG. 17 illustrates a tree 80 that has been transplanted in the ground with the potting tube 20 secured to the ground with stakes 72. After transplanting, the extension tube 36 may then be secured to the potting tube 20 in an extended position, as shown in FIG. 17, to provide greater protection for the young tree 80. The lip 40 at the top end 44 of the extension tube 36 has a curved surface so that when the young tree 80 blows in the wind the bark of the tree will not be damaged by rubbing against the top of the extension tube 36. The lower set of holes 28 on the potting tube 20 may provide venting when the extension tube 36 is in an extended position to increase air flow and reduce heat inside the tubes. In other instances, the holes 28 may allow water to pass through in certain wetland or marsh environments in which water is present on a permanent or temporary basis.

The potting tube 20 and extension tube 36 may be left in place to function as a tree guard for an extended period of time, which may be up to several years, until the tree 80 is sufficiently large that it no longer requires protection to ensure survival. At this time, the tubes are preferably removed from the tree by cutting the tubes from the trunk of the tree. If removal is not possible or not done in time, the lines of perforations 30 and 42 on the potting tube 20 and extension tube 36, respectively, allow the tubes to be broken into two parts by the natural growth of the trunk of the tree applying pressure on the insides of the tubes.

In a preferred embodiment, the potting tube 20 and the extension tube 36 are made of a material that biodegrades over a period of several years. The material of construction may comprise a polymer such as polyethylene or polypropylene. In a preferred embodiment, the material is also translucent in order to allow sunlight through the tree guard to promote tree growth. The level of translucence may be varied according to various factors, such as environmental factors or tree species. In addition, the color of the potting tubes 20 may also be varied. Each potting tube 20 is preferably about twelve inches long and about four inches in diameter, though the dimensions may be varied according to environmental factors or tree species. Each extension tube 36 and each stake 72 is preferably about the same length as the potting tubes 20.

The potting tube 20 is made of a material that is sufficiently rigid such that the potting tube 20 can be secured to an end cap 50 and function as a pot during the growth period. However, the potting tube 20 preferably has some flexibility. For instance, the potting tube 20 may preferably be partially collapsed along the perforations 30 for ease of shipping, but can be restored to its original tubular shape. The feet 22 of the potting tube 20 are preferably thicker than the walls of the tube to provide adequate support for securing the potting tube 20 to an end cap 50 and for securing the potting tube 20 to the ground with stakes 72 to function as a tree guard. The extension tube 36 is preferably made of a similar material as the potting tube 20, though the extension tube 36 may be slightly more flexible and less rigid than the potting tube 20. Greater flexibility of the extension tube 36 may allow the protrusions 38 to more easily move in and out of the upper and lower sets of holes 26 and 28 for securing the extension tube 36 in the collapsed and extended positions.

The tray 70 and bottom end caps 50 may be made of any suitable rigid material, such as metal or a hard plastic material. The tray 70 is preferably made of plastic in order to minimize its weight for transporting the tray 70 with attached potting tubes 20 to a transplanting site, which may be done manually. The tray 70 may optionally have handles attached thereto for ease of lifting and carrying the tray.

Tree seedlings may alternatively be grown and transplanted individually using a potting tube 20 and individual bottom end caps 50 detached from the tray 70, such as the end caps shown in FIG. 6, 9, or 11.

It is understood that versions of the invention may come in different forms and embodiments. Additionally, it is understood that one of skill in the art would appreciate these various forms and embodiments as falling within the scope of the invention as disclosed herein.

What is claimed is:

1. A method of growing and protecting seedlings, said method comprising the steps of:
   providing a system comprising:
   a plurality of potting tubes each having a top end and a bottom end, wherein the top end and the bottom end are open; and
   a tray having a plurality of bottom end caps attached to the tray, wherein each bottom end cap and each potting tube are configured to removably secure a potting tube to a respective bottom end cap such that the bottom end cap covers the opening at the bottom end of the potting tube;

removably securing one respective potting tube to each respective bottom end cap attached to the tray;

planting a tree seed or seedling in each respective one of the potting tubes removably secured to the bottom end caps of the tray;

removing each respective potting tube along with a respective tree seedling growing inside the potting tube from each respective bottom end cap attached to the tray after a growth period; and transplanting each respective tree seedling in the ground at a final location with the potting tube in which the tree seedling was growing during the growth period surrounding the tree seedling for protection.

2. The method of claim 1, wherein each potting tube has feet attached to the exterior of the potting tube adjacent to the bottom end and extending outwardly from the potting tube in a radial direction, wherein each bottom end cap comprises an attachment element corresponding to a respective foot of each potting tube, and wherein each attachment element has a slot configured for simultaneously inserting a foot of each potting tube into a respective slot such that each potting tube is removably secured to a respective bottom end cap.

3. The method of claim 1, wherein each potting tube has a line of perforations on opposing sides of the potting tube such that the potting tube can be broken into two parts.

4. The method of claim 1, wherein the system further comprises a plurality of extension tubes each having a top end and a bottom end, wherein the top end and the bottom end are open, wherein each potting tube and each extension tube are configured to secure the bottom end of one respective extension tube to the top end of one corresponding potting tube, said method further comprising the step of securing the bottom end of one respective extension tube to the top end of each respective potting tube surrounding a tree seedling after transplanting.

5. The method of claim 1, wherein each potting tube has feet attached to the exterior of the potting tube adjacent to the bottom end of the potting tube, wherein each foot of each potting tube has a hole extending therethrough, said system further comprising a plurality of stakes, wherein each stake is configured for inserting the stake into a respective hole in a foot, said method further comprising the step of inserting one respective stake through each respective hole in a foot and driving each stake into the ground to secure each potting tube to the ground.

6. The method of claim 1, wherein the step of transplanting each respective tree seedling in the ground comprises placing each respective potting tube in which a tree seedling is growing on the ground and then pushing the tree seedling growing inside the potting tube and its corresponding root mass downward into the ground through the open bottom end of the potting tube.

7. The method of claim 1, wherein each potting tube is constructed of a translucent material.

8. The method of claim 4, wherein each extension tube is constructed of a translucent material.

* * * * *